Figures 1, 2, 3:
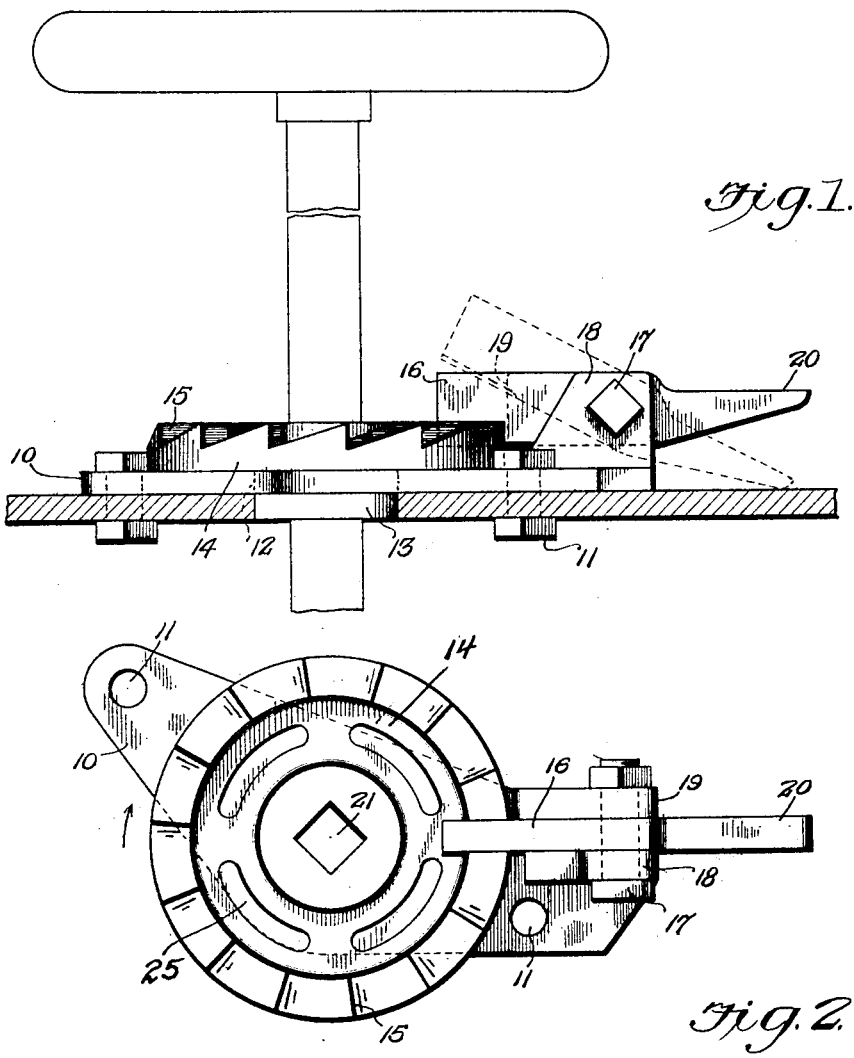

R. L. JAMES.
BRAKE HOLDING DEVICE.
APPLICATION FILED MAR. 9, 1921.

1,397,866.

Patented Nov. 22, 1921.

Inventor
Robert L. James
By A. B. Foster.
Attorney

UNITED STATES PATENT OFFICE.

ROBERT L. JAMES, OF BIRMINGHAM, ALABAMA.

BRAKE-HOLDING DEVICE.

1,397,866.  Specification of Letters Patent.  Patented Nov. 22, 1921.

Application filed March 9, 1921. Serial No. 450,904.

*To all whom it may concern:*

Be it known that I, ROBERT L. JAMES, a citizen of the United States, residing at Birmingham, in the county of Jefferson and State of Alabama, have invented certain new and useful Improvements in Brake-Holding Devices, of which the following is a specification.

The present invention relates to a locking device for holding the brakes of a car in a set position and is intended to provide a brake locking device which will be simple in construction, inexpensive to build, certain in its operation and not likely to get out of order or to become worn out.

The preferred form of construction of my device is shown in the annexed drawing, in which Figure 1 represents a side elevation of the entire device, showing the car platform in section, and showing a brake staff and handle connected therewith. Fig. 2 represents a top plan view of the device itself, with the brake staff removed, and Fig. 3 shows a perspective side view of the locking end of the dog, showing the beveled end thereof, which engages the ratchet pinion teeth.

Referring now more particularly to the drawings, a suitable base 10 is provided, this being equipped with holes 11 through which bolts may pass to secure the same to the platform of the car. The car may be any kind of a car used on steam or electric railways, such as a freight car, flat car, coal car or passenger car, or the like. Provided in the base at about its central point is a circular opening 12, which serves as a bearing for a projection 13 formed upon the underside of a ratchet pinion 14, this being provided on its top surface with teeth 15, capable of engaging a dog or pawl 16. The said dog is mounted pivotally on the pin or bolt 17, carried between two lugs 18. These lugs are preferably situated at a point some distance away from the periphery of the ratchet pinion 14. The ratchet pinion 14 is, when tightening the brake, rotated in the direction of the arrow shown in Fig. 1. The strain of the brake chain on the dog accordingly is in the opposite direction when the dog is holding the ratchet pinion from rotating. To take the strain in a perfectly safe manner the lug 19 is of such a length as to reach nearly into contact with the periphery of the pinion. The lug 18 may, if desired, be of the same length, but it may be considerably shorter, as shown in the drawing.

It will be understood that the heavy end of the dog 16 is the end toward the ratchet pinion. To release the ratchet pinion it is accordingly only necessary to turn the brake handle sufficiently to take the strain off the dog and to then step upon the short end 20 of the dog, which will raise the long end above the ratchet teeth, after which releasing the handle will allow the ratchet pinion to rotate in a direction opposite to that of the arrow shown.

The ratchet pinion 14 and the projection 13 thereof are provided with a suitable opening for carrying the brake staff, and a square opening, shown at 21, is preferable for this purpose.

In Fig. 3, the portion of the dog which contacts with the upper surface of the ratchet teeth is preferably beveled, as shown at 22, for the purpose of providing a good seating surface on the teeth of the ratchet.

For the outlet of water, dust, etc., to run out, openings such as at 25 may be provided, if desired.

It will accordingly be seen that any wear on the dog, particularly that portion which comes into contact with the ratchet teeth, will only serve to make the same seat itself better in the teeth of the ratchet pinion.

From the above description it will be appreciated that the device does not contain any parts which are likely to get out of order or to become inoperative through wearing away. The device is further economical to build since it does not require any extensive amount of machining and the amount of material used is small, as compared with the devices in common use. On account of the fact that the dog 16 drops by gravity into the locked position, the brake will stand normally locked, and it can only get unlocked by stepping on the projecting end 20. This is a material advantage over any of the brake locking devices now in common use, the normal position of which is the unlocked position, and the manipulation of the air pressure system, which operates the air brake, may serve to unlock the hand brakes which have been set. This sometimes occurs, due to a pawl being worn round at the end and will not stay set in the ratchet teeth.

The entire device may be made of material which is available at moderate prices, such as wrought iron or steel or malleable iron and in some cases cast iron may be satisfactorily employed, for all or a portion of the parts. When it is to be used on an iron platform, the base can be case integral therewith, if desired.

Heretofore complicated devices have been proposed (most of which have not come into extensive commercial use) for preventing snow and ice from clogging or interfering with the operation of brake holding devices of the pawl and ratchet type. In many instances these devices have been so complicated that they were liable to get out of order and in many cases have been so expensive to construct that the railroads would not adopt the same. It is not necessary to make any provision in the present device for overcoming the effects of snow and ice since if snow and ice should accumulate in the ratchet teeth 15 the brakeman can force down the dog 16 by stepping upon the same, which is a much simpler operation than pushing the dog into the teeth of a pinion when the teeth are on the side of the pinion.

I call attention to the fact that on account of the location of the dog and of the lugs which carry the dog, substantially all of the strain is taken by the longer of the two lugs, and practically no strain is placed upon the bolt or pin which holds the dog.

Without restricting myself to specific dimensions I wish to state, for the purpose of illustration, that the diameter of the ratchet pinion may be $5\frac{1}{2}$ inches; the square hole for carrying the brake staff may be $1\frac{1}{8}$ inches; the bolts for holding the base on the platform of a car may be $\frac{3}{8}$ inches; the bearing below the pinion wall may be $2\frac{1}{2}$ inches; the distance, from its point of attachment to the inner end of the ratchet teeth, may be $2\frac{1}{4}$ inches and the light end of the dog may be $2\frac{3}{4}$ inches. The entire base may be about 9 inches long and about 4 inches wide at its widest point. I call particular attention to the radial location of the dog relative to the ratchet pinion and to the shortness of the distance between the periphery of the ratchet pinion and the end of the long lug. The diameter of ratchet pinion thickness of lugs supporting pawl, size of bolts, etc., must conform to the requirements of U. S. safety appliances.

I claim:

1. A brake locking device comprising a rotatable pinion, a pivoted dog adapted to seat itself by gravity in the successive notches of the ratchet pinion, said dog being located substantially radial to the axis of rotation of said ratchet pinion, the said dog being located between a pair of stationary lugs, the one of said lugs which receives the thrust of the dog being of sufficient length to reach nearly into contact with the periphery of said ratchet pinion.

2. A brake locking device comprising a rotatable ratchet pinion, a pivoted dog adapted to seat itself by gravity in the successive notches of the ratchet pinion, said dog being located substantially radial to the axis of rotation of said ratchet pinion, the said dog being located between a pair of stationary lugs, the one of said lugs which receives the thrust of the dog being of sufficient length to reach nearly into contact with the periphery of said ratchet pinion, a base for carrying such elements, such ratchet pinion being provided with an axial cylindrical projection having a bearing in said base, such lugs being integral with such base, such base further being provided with means for securing same to a car platform.

3. A brake locking device comprising a rotatable ratchet pinion, a pivoted dog adapted to seat itself by gravity in the successive notches of the ratchet pinion, said dog being located substantially radial to the axis of rotation of said ratchet pinion, the said dog being located between a pair of stationary lugs, the one of said lugs which receives the thrust of the dog being of sufficient length to reach nearly into contact with the periphery of said ratchet pinion, the said dog being pivotally mounted between said lugs, at near the end remote from said ratchet pinion being beveled at the surface of contact with said pinion, said dog engaging the teeth of said ratchet pinion on the side adjacent said lugs.

4. A base adapted for attachment to a car platform, a circular bearing therein, a pair of spaced substantially parallel upstanding lugs carried by said base, a ratchet pinion having ratchet teeth on upper surface, and being provided with an axial, downwardly extending circular bearing member carried thereby, said bearing member being adapted to rotate in said circular bearing, a dog pivotally mounted between said lugs by a support extending therethrough, said dog being substantially radial with respect to said ratchet pinion, and the heavy end of said dog engaging the teeth of said ratchet pinion on the side thereof adjacent said lugs, said bearing member and ratchet pinion being perforated for receiving and holding a brake staff.

5. In the device as set forth in claim 1, a dog, the heavy end of which contacts with the teeth of said ratchet, on the side of said ratchet toward said lug.

In testimony whereof I affix my signature.

ROBERT L. JAMES.